(12) United States Patent
Vidaurri et al.

(10) Patent No.: US 6,946,540 B2
(45) Date of Patent: Sep. 20, 2005

(54) METHOD OF MEASURING EXTENT OF CURING OF COMPACTED POLY(ARYLENE SULFIDE)

(75) Inventors: Fernando C. Vidaurri, Bartlesville, OK (US); Aubrey South, Jr., Bartlesville, OK (US); David A. Soules, Bartlesville, OK (US); Jeffrey S. Fodor, Borger, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 61 days.

(21) Appl. No.: 10/395,919

(22) Filed: Mar. 24, 2003

(65) Prior Publication Data

US 2004/0192882 A1 Sep. 30, 2004

(51) Int. Cl.$^7$ .............................................. C08G 10/02
(52) U.S. Cl. ...................... 528/244; 422/131; 422/135; 525/537; 528/226
(58) Field of Search ................................. 422/131, 135; 525/537; 528/226, 244

(56) References Cited

U.S. PATENT DOCUMENTS

| | | | |
|---|---|---|---|
| 2,572,693 A | 10/1951 | Boyle | 73/59 |
| 3,493,345 A | 2/1970 | Windley | 23/230 |
| 3,722,262 A | 3/1973 | Gilinson, Jr. et al. | 73/59 |
| 3,841,147 A | 10/1974 | Coil et al. | 73/56 |
| 3,875,791 A | 4/1975 | Fitzgerald et al. | 73/59 |
| 4,370,471 A * | 1/1983 | Salmon | 528/388 |
| 4,421,910 A | 12/1983 | Mathis et al. | 528/388 |
| 4,510,297 A * | 4/1985 | Moberly | 525/537 |
| 4,535,117 A | 8/1985 | Mathis et al. | 524/397 |
| 4,680,958 A | 7/1987 | Ruelle et al. | 73/56 |
| 4,760,734 A | 8/1988 | Maxwell | 73/60 |
| 4,794,164 A | 12/1988 | Iwasaki et al. | 528/388 |
| 4,918,134 A | 4/1990 | Kato et al. | 524/609 |
| 5,078,007 A | 1/1992 | Tadros | 73/56 |
| 5,079,290 A | 1/1992 | Wright | 524/609 |
| 5,110,901 A | 5/1992 | Hoover et al. | 528/387 |
| 5,847,267 A | 12/1998 | Janzen | 73/54.01 |
| 6,066,280 A | 5/2000 | Abbondanza et al. | 264/126 |
| 6,102,980 A | 8/2000 | Endo et al. | 75/252 |
| 6,342,573 B1 | 1/2002 | Antonio et al. | 526/347.2 |
| 2002/0007665 A1 | 1/2002 | Miura | 73/54.25 |

FOREIGN PATENT DOCUMENTS

| | | |
|---|---|---|
| EP | 000216994 | 4/1987 |
| EP | 0 272 812 | 6/1988 |
| EP | 0 309 916 | 4/1989 |
| JP | 406001855 | 1/1994 |

OTHER PUBLICATIONS

PCT/US2004/008601 International Search Report (Sep. 28, 2004).

* cited by examiner

*Primary Examiner*—Terressa Boykin
(74) *Attorney, Agent, or Firm*—Williams, Morgan & Amerson, P.C.

(57) ABSTRACT

Disclosed herein is a process for preparing cured arylene sulfide polymers. A first curing vessel comprising a first agitator is used to cure a poly(arylene sulfide) compacted powder. The curing proceeds until the compacted powder reaches a melt flow rate within a target range. When the melt flow rate of the compacted powder first reaches the target range, the power consumption of the first agitator is determined. A second curing vessel comprising a second agitator is charged with a second quantity of the compacted poly(arylene sulfide) powder. The second quantity of compacted powder is cured in the second vessel until the power consumption of the second agitator reaches the value at which the melt flow rate in the first curing vessel first reached the target range.

22 Claims, 4 Drawing Sheets

METHOD OF MEASURING EXTENT OF CURING OF COMPACTED POLY(ARYLENE SULFIDE)

BACKGROUND OF THE INVENTION

This invention relates to poly(arylene sulfide) (PAS) curing. More particularly it concerns methods and apparatus for curing compacted PAS.

Poly(arylene sulfide) (PAS) polymers are generally known in the art, and are suitable for many applications due to their high temperature and chemical resistance, good electrical properties and inherent flame retardancy. The production of PAS for a variety of industrial and commercial uses has been known for some time. PAS is moldable into various articles including, but not limited to, parts, films, and fibers by means of, for example, injection molding and extrusion molding techniques. For example, PAS can be utilized as a material for preparing electrical and electronic parts and automotive parts.

Poly(arylene sulfide) polymer powders and compacted powders are generally cured before being used to form final products. The determination of when a compacted PAS has finished curing can involve taking samples of compacted PAS throughout the curing process and determining the melt flow rate of each of the samples.

SUMMARY OF THE INVENTION

Certain embodiments of the present invention are directed to processes for preparing cured arylene sulfide polymers, particularly cured poly(phenylene sulfide).

In certain embodiments a quantity of a compacted poly (arylene sulfide) powder is charged into a curing vessel that comprises an agitator. The quantity of compacted powder is cured by a process comprising heating and simultaneously agitating the compacted powder with the agitator until the power consumption of the agitator reaches a target value, thereby producing a cured powder. In certain embodiments the target value is determined by reference to a lookup table. In some embodiments the compacted poly(arylene sulfide) powder is a compacted poly(phenylene sulfide) powder. In certain embodiments, at the target value, the cured powder has a melt flow rate that is between about 2% and 95% less than the melt flow rate of the compacted powder before curing. In some embodiments the compacted powder is a compacted poly(phenylene sulfide) powder, and at the target value the cured powder has a melt flow rate that is less than about 2500 g/10 min.

Certain embodiments are directed to processes involving charging a first curing vessel that comprises a first agitator with a first quantity of a compacted poly(arylene sulfide) powder. The first quantity of compacted powder is cured by a process comprising heating and simultaneously agitating the compacted powder with the first agitator until the compacted powder reaches a melt flow rate within a target range. In certain embodiments, the curing of the first quantity of compacted powder is can be performed at a temperature between just below the $T_m$ of the poly(arylene sulfide) and a temperature lower by 80° C. than the $T_m$. In certain embodiments the compacted powder can be pre-heated before being charged into the first curing vessel. The target range for curing can, in some embodiments, be between about 2% and 95% less than the melt flow rate of the compacted powder before curing. In certain embodiments the compacted powder is a compacted poly(phenylene sulfide) powder, and the target range is less than about 2500 g/10 min.

The first agitator can be calibrated by determining the power consumption of the first agitator when the melt flow rate of the compacted powder first reaches the target range during curing. In some embodiments, the calibrating is done by a process comprising removing a plurality of samples of the compacted powder from the first curing vessel over time during the curing step. The melt flow rate of a sample is determined at each time point, as well as the power consumption of the first agitator at the same point. The power consumption of the first agitator is determined for the earliest time point at which the melt flow rate of a sample is within the target range, thereby determining the power consumption of the agitator required for agitating the first cured powder.

A second curing vessel is charged with a second quantity of the compacted poly(arylene sulfide) powder. In some embodiments, the second curing vessel is essentially the same as the first curing vessel (e.g., substantially similar chamber, heating, and agitator). In certain embodiments the first curing vessel and the second curing vessel are the same vessel. The compaction and amount of the second quantity are substantially identical to that of the first quantity of compacted PAS powder charged into the first curing vessel. The second curing vessel comprises a second agitator. The second quantity of compacted powder is cured by a process comprising heating and simultaneously agitating the compacted powder with the second agitator until the power consumption of the second agitator reaches the value at which the melt flow rate in the first curing vessel first reached the target range, thereby producing a second cured powder. In certain embodiments, the second quantity is heated to about the same temperature (e.g., within ±5° C.) as the first quantity during curing. In some embodiments (a) the melt flow rate of a sample (e.g., of the first quantity) at at least one time point, and (b) the power consumption of the first agitator at the same time point(s) can be used to generate a mathematical function dependent on at least (a) and (b) that can be used to calculate the level of power consumption by the second agitator that results in production of the cured second powder. In some embodiments, the second quantity is pre-heated before being charged into the second curing vessel.

Certain methods of the present invention can simplify the determination of when a compacted PAS has finished curing, when compared to known processes, which require taking samples of compacted PAS throughout the curing process and determining the melt flow rate of each of the samples to determine when the compacted PAS is cured.

BRIEF DESCRIPTION OF THE DRAWINGS

The following drawings form part of the present specification and are included to further demonstrate certain aspects of the present invention. The invention can be better understood by reference to one or more of these drawings in combination with the detailed description of specific embodiments presented herein.

DESCRIPTION OF ILLUSTRATIVE EMBODIMENTS

Figure 1:
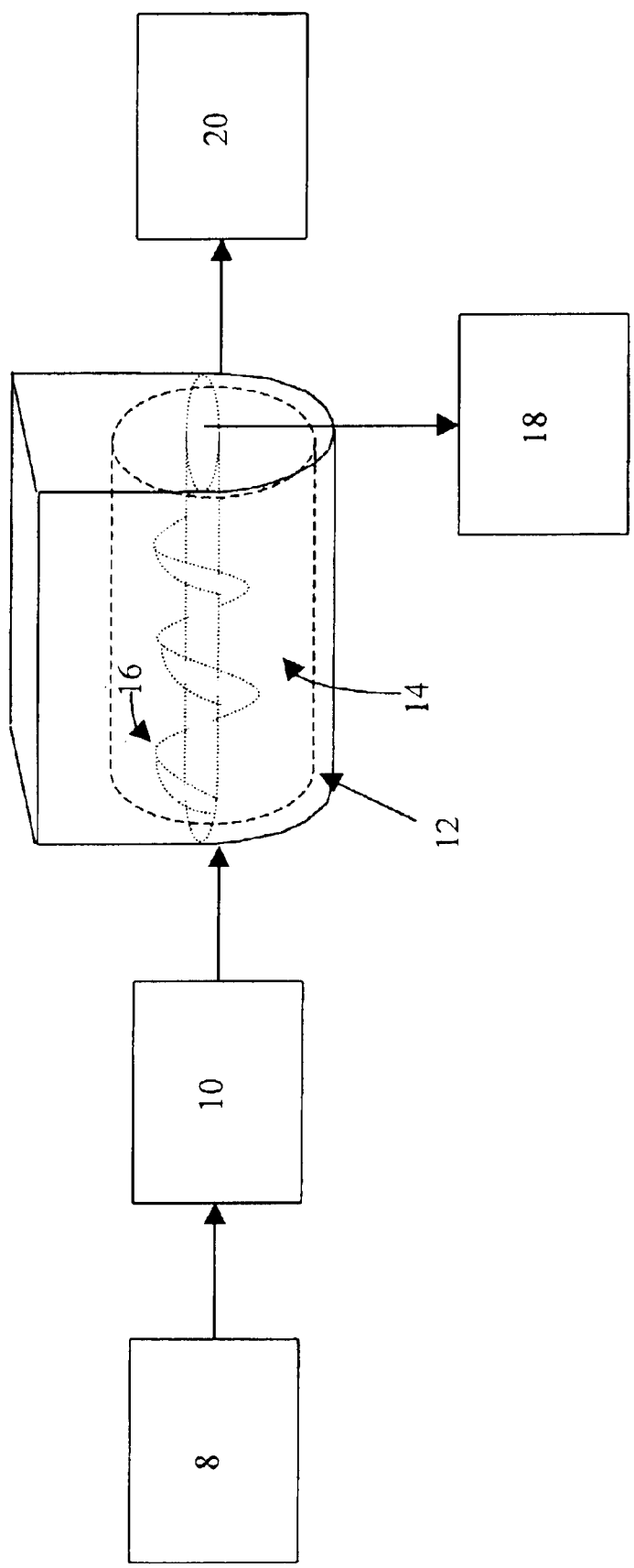
FIG. 1 is a scheme for preparing a cured poly(arylene sulfide).
Figure 2:
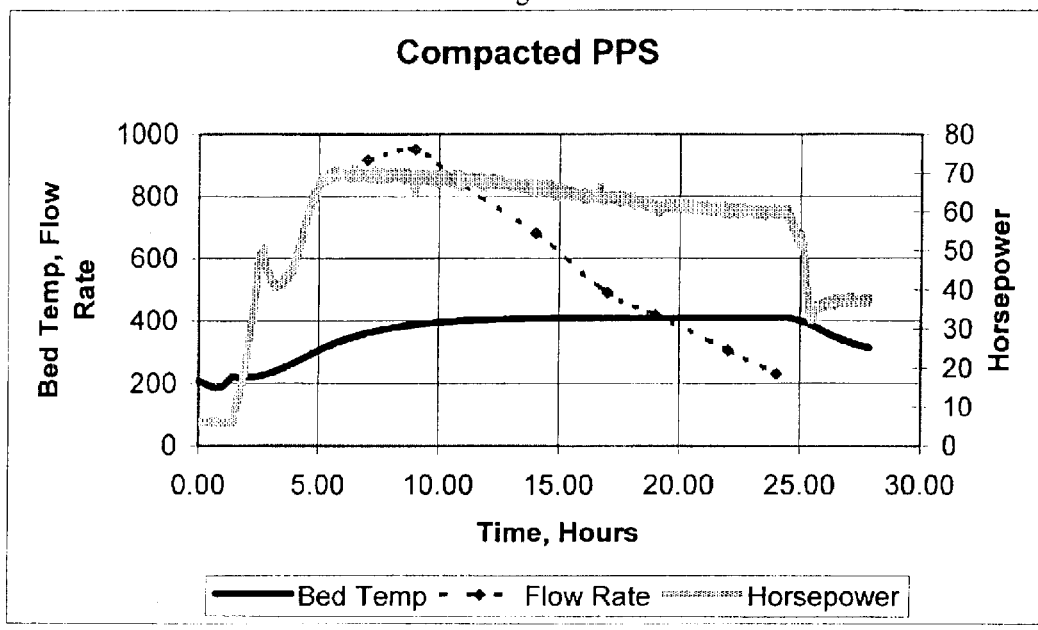
FIG. 2 is a graph of melt flow rate (g/10 min), bed temperature (° F.), and horsepower (HP) of compacted PPS vs. time (hours) during curing.
Figure 3:
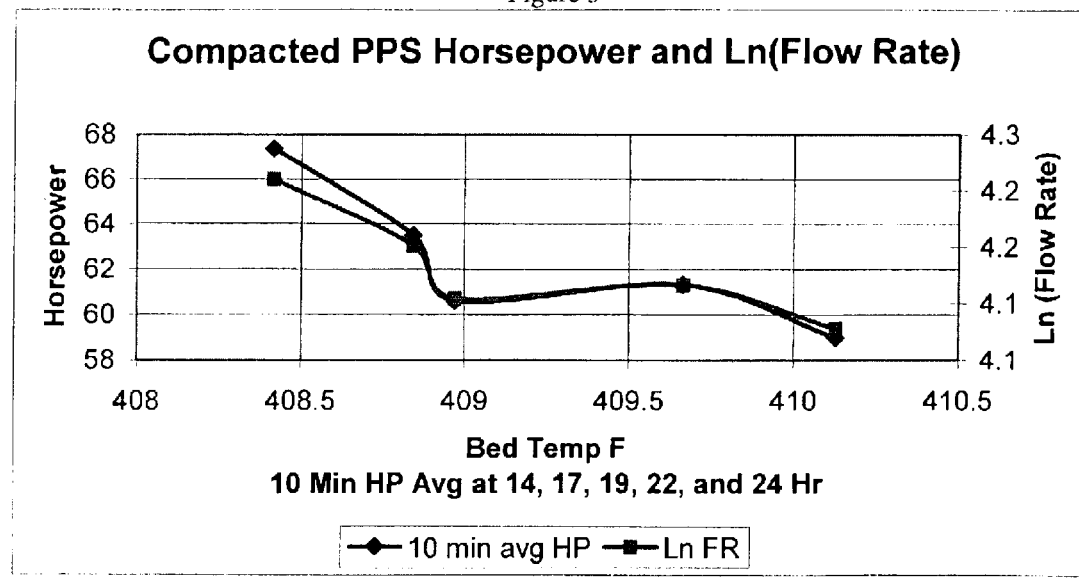
FIG. 3 is a graph of 10 minute horsepower (HP) average and Ln(melt flow rate) vs. bed temperature (° F.) at 14, 17, 19, 22, and 24 hours during curing of compacted PPS.
Figure 4:
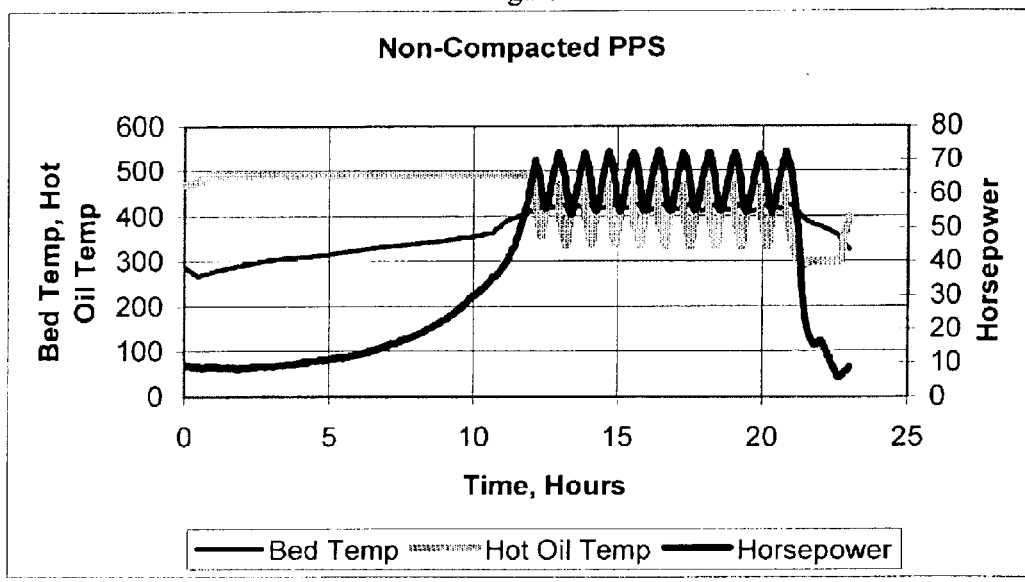
FIG. 4 is a graph of hot oil temperature (° F.), bed temperature (° F.), and horsepower (HP) of non-compacted PPS vs. time (hours) during curing.
Figure 5:
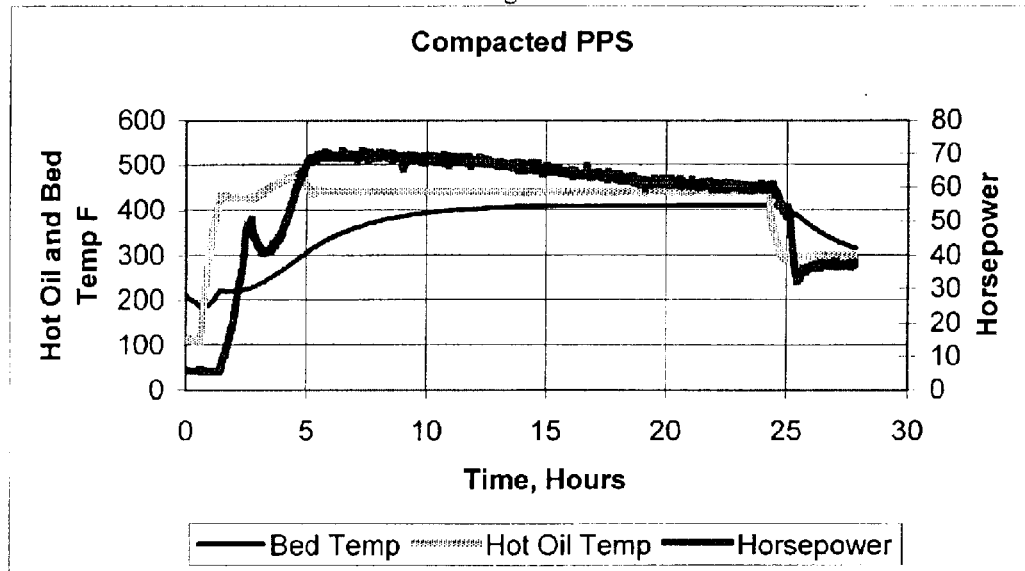
FIG. 5 is a graph of hot oil temperature (° F.), bed temperature (° F.), and horsepower (HP) of compacted PPS vs. time (hours) during curing.
Figure 6:
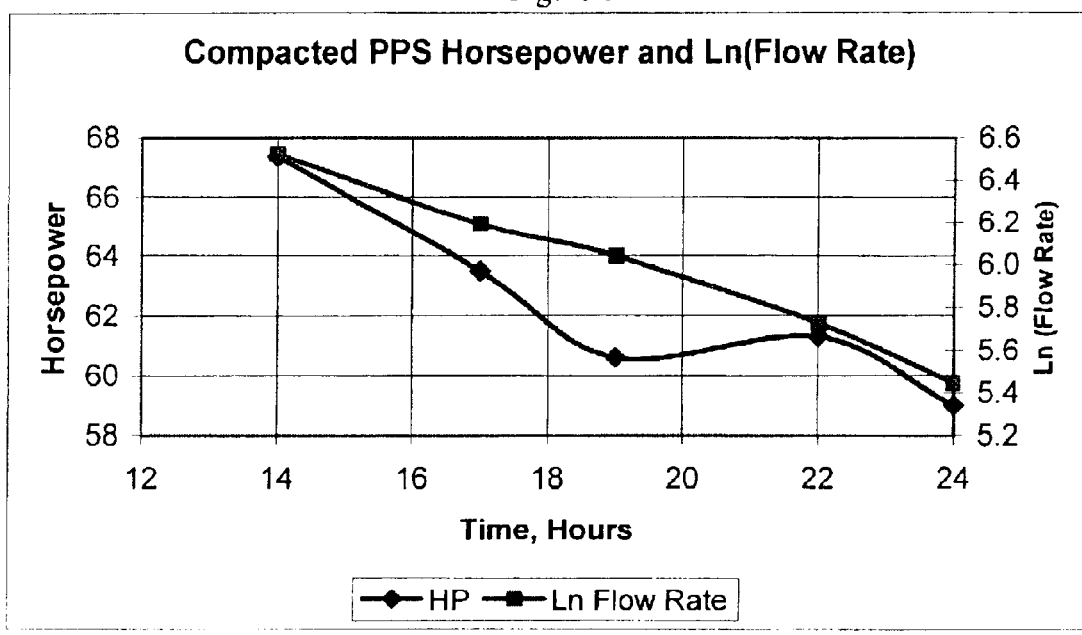
FIG. 6 is a graph of horsepower and Ln(melt flow rate) vs. time (hours during curing of compacted PPS.

Processes of the present invention are directed to preparing cured compacted arylene sulfide polymers. FIG. 1 depicts a scheme for one embodiment of a process of the present invention.

A poly(arylene sulfide) (PAS) powder is compacted 8 using methods known in the art. In certain embodiments, the compacted PAS comprises compressed resin of which between about 25 and 50% is retained on a #6 US standard size screen, between about 30 and 45% is retained on a #16 US standard screen, and between about 20 and 40% passes through a #16 screen. In some embodiments, the compacting method involves a roll compactor followed by a mill. PAS that is to be compacted is fed to the roll compactor, where it is made to travel between two large, heavy rolls, having a certain pressure and clearance between the rolls. The material exits from the rolls in large compacted forms, and the form depends on the shape of the rolls. These large compacted forms are then dropped into a mill where they are ground such that the maximum particle size is less then some pre-determined size usually dictated by a screen that encapsulates the grinding machinery. The option is also available to put a screen and recycle following the mill. Such a recycle system can allow undersized material to be recycled back through the rolls and mill, and the product can then be set within an upper and lower bound with respect to particle size. In certain embodiments, the PAS is compacted at a pressure between about 600 and 1400 psi and at ambient temperature.

Poly(arylene sulfide) polymers (PASs) that can be compacted and cured using the present invention are polymers known in the art, and they can be linear or branched. In some embodiments, the PASs used in the present invention have melting points in the range from about 200° C. to about 500° C. In certain embodiments the PASs used in the present invention are phenylene sulfide polymers (PPSs), which have melting points from between about 250° C. to about 350° C. The compacted PAS powder used in the present invention can comprise a single PAS or it may comprise a blend of two or more different poly(arylene sulfides).

Poly(arylene sulfides) can be prepared by any process known in the art. The PASs are generally prepared by contacting reactants comprising a dihalosubstituted aromatic compound, a sulfur source and a polar organic compound under polymerization conditions. PASs can also be prepared using alkali metal carboxylates and/or polyhaloaromatic compounds during polymerization. Specific examples of PAS polymers suitable for purposes of this invention include poly(2,4-toluene sulfide), poly(4,4'-biphenylene sulfide), and poly(phenylene sulfide), among others. The compacted poly(arylene sulfide) can optionally be pre-heated 10 before being charged into the first curing vessel 14. In certain embodiments, during pre-heating, the compacted powder is heated up to or near the temperature (e.g., within 50° C. in certain embodiments) at which the compacted powder is to be cured. The temperature of the compacted powder of the present invention refers to the skin temperature of the individual particles of the compacted powder.

A first quantity of compacted, and optionally pre-heated, PAS powder is charged into the first curing vessel 14 comprising a first agitator 16. The vessel could optionally comprise more than one agitator. The first quantity of compacted powder is cured by a process comprising heating and simultaneously agitating the compacted powder in the curing vessel 14 with the first agitator 16 for a time sufficient to effect the desired amount of cure (e.g., the compacted powder reaches a melt flow rate within a target range), thereby producing a first cured powder. In some embodiments, the compacted powder is heated in the presence of air. The quantity of compacted PAS charged into the curing vessel is less than the amount that would overload the agitator, and less than or equal to the amount of compacted PAS that will fit into the curing vessel. For example, when compacted PPS powder is charged into a curing vessel that is approximately 600 cubic feet in size with a paddle type agitator being rotated at about 120 rpm with a 100 hp motor, and the hp will be kept at or below about 65 hp, the amount of compacted PPS added to the vessel is between about 7000 and 9500 kg with a bulk density of about 40 lb/ft$^3$. Samples for melt flow measurement are taken from the first vessel 14 periodically to determine the melt flow rate of the compacted powder as it is being cured.

PASs used in certain embodiments of the present invention can have melt flow rates of greater than about 100 g/10 min to greater than 4000 g/10 min before curing. In some embodiments, the target melt flow rate of the PAS that is being cured is between about 5 and about 2500 g/10 min.

The compacted PAS powders are, in certain embodiments, heated to a curing temperature between just below (i.e., about 10–5° C. below) the $T_m$ of the poly (arylene sulfide) and to a temperature lower by 80° C. than the $T_m$. During curing, when the compacted powder is a PPS, it can be heated to a temperature between about 175° C. and 350° C., and the temperature is below the $T_m$ of the particular PPS. In some embodiments, the compacted poly (phenylene sulfide) powder is heated to a temperature below its $T_m$, and between about 175° C. and 250° C. during the curing step. In certain embodiments, the compacted PAS powder is maintained at about the same temperature (within about ±20° C.) during the curing process.

The first quantity of poly(arylene sulfide) to be cured is charged into a first curing vessel 14. Any curing vessel known in the art that comprises an agitator can be used in the present invention. In certain embodiments the agitator can be a paddle wheel or a ribbon blender. In one embodiment, the curing vessel 14 comprises a steel, hollow cylinder disposed on a horizontal axis. Alternatively the curing vessel 14 can have a bottom half that comprises a horizontal, hollow cylinder that is coupled with a top half that comprises a hollow, rectangular box. The vessel 14 contains a ribbon agitator 16 having a horizontal shaft having a horizontal axis such that it is concentric with the bottom half of the curing vessel 14 (e.g., hollow cylinder). Alternatively, the curing vessel can contain a paddle agitator 16 on a horizontal shaft having a horizontal axis that is concentric with the bottom half of the curing vessel. The shaft of the paddle or ribbon agitator 16 is driven by a motor 18, having means for measuring the power consumption required to agitate the first quantity of compacted powder during curing. Suitable means for measuring the power consumption by the motor include standard electrical horsepower metering devices, which work by measuring the amperage draw and the voltage on a motor and translating these measurements into horsepower.

There is an inlet at the top of the vessel and an outlet at the bottom of the vessel. The inlet is provided with a valve that controls the flow of material to the curing vessel. At each end inside of the vessel, a scraper is mounted on the shaft. These scrapers serve to reduce accumulation of material at the ends of the agitator. Such devices are well known in the art.

The curing vessel 14 can be heated using any heater known in the art. In certain embodiments, the curing vessel is heated using a hot oil bath 12. When the compacted PAS powder that is being cured is poly(phenylene sulfide) the temperature of the hot oil can, in certain embodiments, be as high as about 260° C. The temperature of the hot oil is adjusted to maintain the temperature of the compacted PAS within about 10% of the desired curing temperature of the compacted PAS, and in some embodiments within about 1 to 5% of the desired curing temperature. Thus, for example, if the desired curing temperature is about 200° C., the temperature of the compacted PAS can be maintained at a temperature of between about 180° C. and about 220° C. during the curing process. In certain embodiments, the actual temperature of the hot oil can be higher than the curing temperature of the compacted PAS.

The first agitator 16 is calibrated by determining the power consumption of the motor 18 when the melt flow rate of the compacted powder first reaches the target range during the curing step. The calibration can be accomplished by removing a plurality of samples of the compacted powder from the first curing vessel 14 periodically over time during curing. The melt flow rate of a sample at a time point, and power consumption of the first agitator at the same time point are found. The power consumption (e.g., horsepower, watts, Btu/hr, among others) can be determined using methods known in the art. Local averages at particular sample times for temperature and power consumption can be used to attenuate noise. The earliest time point at which the melt flow rate of a sample is within the target range is also determined. Thus, the power consumption of the agitator required for agitating the first cured powder is established.

Surprisingly, as compacted PAS powder is maintained at its curing temperature the power consumption of the agitator decreases. When the target melt flow rate is attained, the heating of the vessel 14 can be discontinued and cooling of the vessel can be initiated to lower the temperature of the compacted powder to stop the curing process, e.g., from about 230° C. to about 180° C. At that time the cured polymer can be transferred to containers or bins 20 where it is further cooled to room temperature.

A second curing vessel comprising a second agitator, wherein the curing vessel is as described above, is charged with a second quantity of the compacted poly(arylene sulfide) powder, also as described above. The type of powder, its compaction and the amount of the second quantity are substantially identical to that of the first quantity (e.g., both within about 10% of the values for the first quantity). The second curing vessel comprises a second agitator. Optionally, the second curing vessel can comprise more than one agitator. In certain embodiments the second curing vessel is the same vessel as the first curing vessel. In some embodiments, the second curing vessel is essentially identical to the first curing vessel having substantially the same agitator, dimensions, heater, and motor to drive the agitator. In certain embodiments, the second curing vessel is heated, as described above, to about the same curing temperature as the first curing vessel (e.g., within about 5° C.). In some embodiments, the second quantity of compacted powder is pre-heated before being charged into the second curing vessel, and the second quantity is pre-heated to about the same temperature as the first quantity. The pre-heating step is as described above.

The second quantity of compacted powder is cured by a process, as described above, comprising heating and simultaneously agitating the compacted powder with the second agitator. The curing is carried on until the power consumption of the second agitator reaches the value at which the melt flow rate in the first curing vessel first reached the target range, thereby producing a second cured powder. In certain embodiments (a) the melt flow rate of a sample (e.g., first quantity of compacted powder) at at least one time point, and (b) the power consumption of the first agitator at the same time point(s) can be used to generate a mathematical function dependent on at least (a) and (b) that can be used to calculate the level of power consumption by the second agitator that results in production of the cured second cured powder.

In certain embodiments, the curing in the second vessel can be repeated multiple times, each time using (1) a similar compacted PAS powder (e.g., compacted essentially the same amount and using the same type of PAS as in the first quantity), (2) a similar or the same curing vessel as the first curing vessel (e.g., including a similar agitator), and (3) a similar quantity (within about 5%) of the compacted PAS powder.

In certain embodiments directed to processes for preparing cured arylene sulfide polymers, a quantity of a compacted poly(arylene sulfide) powder is charged into a curing vessel that comprises an agitator. The agitator can be driven by an electric motor, for example. The quantity of compacted powder is cured by a process comprising heating and simultaneously agitating the compacted powder with the agitator until the power consumption of the agitator reaches a target value, thereby producing a cured powder. For example, the electrical power consumed by the motor that drives the agitator can be monitored until it reaches a pre-determined target. In certain embodiments the target can be determined by reference to a lookup table. A lookup table can be prepared by recording the level of power consumption of a motor that drives the agitator required to prepare a cured powder under given conditions, at a plurality of points in time during the curing process, and analyzing the melt flow rate of the material at those same points in time. Subsequently, when a cured powder is to be produced under the same conditions, the target power consumption can be looked up in the records (e.g., lookup table), and the curing process can be carried out under the conditions until the target power consumption is reached.

In some embodiments the compacted poly(arylene sulfide) powder is a compacted poly(phenylene sulfide) powder. In certain embodiments, at the target value, the cured powder has a melt flow rate that is between about 2% and 95% less than the melt flow rate of the compacted powder before curing. In some embodiments, the compacted powder is a compacted poly(phenylene sulfide) powder, and at the target value the cured powder has a melt flow rate that is less than about 2500 g/10 min.

The following example is included to demonstrate a representative embodiment of the invention. Those of skill in the art should, in light of the present disclosure, appreciate that many changes can be made in the specific embodiments which are disclosed and still obtain a like or similar result without departing from the spirit and scope of the invention.

EXAMPLE 1

PPS powder was compacted using both a Hosokawa Bepex MS-75 compactor/granulator (rates during test up to 2200 lb/hr) and a Hosokawa Bepex CS-25 compactor with corrugated rolls and a model RP-6-K115 Disintegrator (feed rates during tests up to 167 lb/hr). Tests were done with both ½ and ⅜ inch screens on the granulators at ambient temperature. Pressures ranging from 600 to 1400 psi were used to compact the powder. The bulk density of the PPS increased from between about 20 and 27 lb/ft³ in powder form to between about 39 and 42 lb/ft³ for the compacted material. The flake density of the compacted material ranged from about 0.9 to 1.2 g/cc. Product particle size ranged from between about 9 and 16%+4 mesh and 52–81%+14 mesh depending on the screen size used and characteristics of the powder being compacted. Tm and melt flow rate remained approximately the same as the initial powder. The compacted PPS powder was charged to a warm cure vessel (130° F.). 9506 kg of the compacted PPS powder was charged into an approximately 600 cubic ft curing vessel with 120 rpm, 100 hp GE motors rotating a paddle type agitator. The curing vessel was heated with a hot oil jacket set at 255° C. initially, then reduced to about 226° C., and later in the curing process was manipulated in an attempt to control the bed temperature. The power consumption (e.g., horsepower) required by the agitator was determined at various time points, as well as the melt flow rate of the compacted polymer at the same time point. The correlation of the horsepower to cured compacted polymer was determined, and local averages at a sample time for temperature and horsepower were used to attenuate noise in the correlation. (See FIGS. 2–6.) Surprisingly, the power consumption of the agitator decreased over time during the time that the compacted powder was maintained at its curing temperature. This is surprising since power consumption of the agitator did not decrease over time during maintaining the uncompacted PPS powder at its curing temperature. In future curing processes the power consumption of an agitator used in a similar curing vessel to cure a similar quantity of the same compacted powder can be used to track degree of cure and to select the time to end the curing operation.

All of the methods and apparatuses disclosed and claimed herein can be made and executed without undue experimentation in light of the present disclosure. It will be apparent to those of skill in the art that variations may be applied to the methods and apparatuses and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A process for preparing cured arylene sulfide polymers, comprising:
   charging a curing vessel that comprises an agitator with a quantity of compacted poly(arylene sulfide) powder; and
   curing the quantity of compacted powder by a process comprising heating and simultaneously agitating the compacted powder with the agitator until the power consumption of the agitator reaches a target value, thereby producing a cured powder.

2. The process of claim 1, wherein the compacted poly(arylene sulfide) powder is a compacted poly(phenylene sulfide) powder.

3. The process of claim 1, wherein at the target value the cured powder has a melt flow rate that is between about 2% and 95% less than the melt flow rate of the compacted powder before curing.

4. The process of claim 1, wherein the compacted powder is a compacted poly(phenylene sulfide) powder, and wherein at the target value the cured powder has a melt flow rate that is less than about 2500 g/10 min.

5. The process of claim 1, wherein the target value is determined by reference to a lookup table.

6. A process for preparing cured arylene sulfide polymers, comprising:
   charging a first curing vessel comprising a first agitator with a first quantity of a compacted poly(arylene sulfide) powder;
   curing the first quantity of compacted powder by a process comprising heating and simultaneously agitating the compacted powder with the first agitator until the compacted powder reaches a melt flow rate within a target range, thereby producing a first cured powder;
   calibrating the first agitator by determining the power consumption of the first agitator when the melt flow rate of the compacted powder first reaches the target range during the curing step;
   charging a second curing vessel with a second quantity of compacted poly(arylene sulfide) powder wherein the compaction and amount of the second quantity are substantially identical to that of the first quantity, wherein the second curing vessel comprises a second agitator; and
   curing the second quantity of compacted powder by a process comprising heating and simultaneously agitating the compacted powder with the second agitator until the power consumption of the second agitator reaches the value at which the melt flow rate in the first curing vessel first reached the target range, thereby producing a second cured powder.

7. The process of claim 6, wherein the calibrating step comprises:
   removing a plurality of samples of the compacted powder from the first curing vessel over time during the curing step, and determining for each sample (a) melt flow rate of a sample taken at a time point, and (b) power consumption of the first agitator at the same time point; and
   determining the power consumption of the first agitator at the earliest time point at which the melt flow rate of a sample is within the target range, thereby determining the power consumption of the agitator required for agitating the first cured powder.

8. The process of claim 7, wherein (a) the melt flow rate of a sample at at least one time point, and (b) the power consumption of the first agitator at the same time point(s) are used to generate a mathematical function dependent on at least (a) and (b) that can be used to calculate the level of power consumption by the second agitator that results in production of the second cured powder.

9. The process of claim 6, wherein the compacted poly(arylene sulfide) powder is a compacted poly(phenylene sulfide) powder.

10. The process of claim 6, wherein during the curing step, the first quantity of compacted powder is heated at a temperature between just below the $T_m$ of the poly(arylene sulfide) and a temperature lower by 80° C. than the $T_m$.

11. The process of claim 10, wherein the first quantity and the second quantity are heated to the same temperature during curing.

12. The process of claim 6, wherein during the curing step, the first quantity of compacted powder is heated to a temperature below the melting temperature of the compacted powder at between about 175° C. and 350° C., and wherein the compacted powder is a compacted poly(phenylene sulfide) powder.

13. The process of claim 12, wherein the compacted poly(phenylene sulfide) powder is heated to a temperature between about 175° C. and 250° C. during the curing step.

14. The process of claim 6, wherein the first curing vessel is heated using an oil bath.

15. The process of claim 6, wherein the second curing vessel is heated using an oil bath.

16. The process of claim 6, wherein the first quantity of compacted powder is pre-heated before being charged into the first curing vessel.

17. The process of claim 16, wherein the second quantity of compacted powder is pre-heated before being charged into the second curing vessel, and the second quantity is pre-heated to about the same temperature as the first quantity.

18. The process of claim 6, wherein the target range is between about 2% and 95% less than the melt flow rate of the compacted powder before curing.

19. The process of claim 6, wherein the compacted powder is a compacted poly(phenylene sulfide) powder, and the target range is less than about 2500 g/10 min.

20. The process of claim 6, wherein the first curing vessel and the second curing vessel are the same vessel.

21. A process for preparing cured poly(phenylene sulfide), comprising:

charging a first curing vessel comprising a first agitator with a first quantity of a compacted poly(phenylene sulfide) powder;

curing the first quantity of compacted powder by a process comprising heating and simultaneously agitating the compacted powder with the first agitator until the compacted powder reaches a melt flow rate within a target range, thereby producing a first cured powder;

calibrating the first agitator by determining the power consumption of the first agitator when the melt flow rate of the compacted powder first reaches the target range during the curing step;

charging a second curing vessel with a second quantity of compacted poly(phenylene sulfide) powder wherein the compaction and amount of the second quantity are substantially identical to that of the first quantity, wherein the second curing vessel comprises a second agitator; and curing the second quantity of compacted powder by a process comprising heating and simultaneously agitating the compacted powder with the second agitator until the power consumption of the second agitator reaches the value at which the melt flow rate in the first curing vessel first reached the target range, thereby producing a second cured powder.

22. A process for preparing cured arylene sulfide polymers, comprising:

charging a first curing vessel comprising a first agitator with a first quantity of a compacted poly(arylene sulfide) powder;

curing the first quantity of compacted powder by a process comprising (a) heating the first quantity of compacted powder to a temperature between just below the $T_m$ of the poly(arylene sulfide) and a temperature lower by 80° C. than the $T_m$, and (b) simultaneously agitating the compacted powder with the first agitator until the compacted powder reaches a melt flow rate within a target range, wherein the target range is between about 2% and 95% less than the melt flow rate of the compacted powder before curing, thereby producing a first cured powder;

calibrating the first agitator by determining the power consumption of the first agitator when the melt flow rate of the compacted powder first reaches the target range during the curing step;

charging a second curing vessel with a second quantity of compacted poly(arylene sulfide) powder wherein the compaction and amount of the second quantity are substantially identical to that of the first quantity, wherein the second curing vessel comprises a second agitator; and curing the second quantity of compacted powder by a process comprising heating and simultaneously agitating the compacted powder with the second agitator until the power consumption of the second agitator reaches the value at which the melt flow rate in the first curing vessel first reached the target range, thereby producing a second cured powder.

* * * * *